350-96.22 SR
XR 3,878,397 1H
X3082D

United States Patent [11] 3,878,397
Robb et al. [45]* Apr. 15, 1975

[54] ELECTRO-OPTICAL TRANSMISSION LINE

[75] Inventors: Ian E. Robb, Newport Beach, Calif.; John S. Clanton, Alexandria, Va.

[73] Assignee: International Telephone and Telegraph Corporation, New York, N.Y.

[ * ] Notice: The portion of the term of this patent subsequent to May 7, 1991, has been disclaimed.

[22] Filed: June 29, 1973

[21] Appl. No.: 375,159

[52] U.S. Cl. ................ 250/551; 250/227; 350/96 R
[51] Int. Cl. ............................ G02b 5/14; H01j 5/16
[58] Field of Search ............ 250/551, 227; 350/96 R

[56] References Cited

UNITED STATES PATENTS

| | | | |
|---|---|---|---|
| 1,323,309 | 12/1919 | Northrup | 350/96 R |
| 3,423,581 | 1/1969 | Baer | 350/96 R |
| 3,459,240 | 8/1969 | Erickson | 350/96 R |
| 3,629,590 | 12/1971 | Case | 250/551 |
| 3,790,791 | 2/1974 | Anderson | 250/551 |
| 3,803,409 | 4/1974 | Prochazka | 250/227 |

*Primary Examiner*—James W. Lawrence
*Assistant Examiner*—T. N. Grigsby
*Attorney, Agent, or Firm*—Thomas L. Peterson

[57] ABSTRACT

An electro-optical transmission line for use in an interconnection system wherein an electrical signal is converted to an optical output signal by a light-emitting diode and the optical light signal is transmitted by an optical fiber bundle to a light receiving diode which converts the optical signal back to an electrical signal. The optical bundle is terminated at its ends in sleeves which are threadedly engaged with coaxial electrical contact assemblies.

3 Claims, 4 Drawing Figures

3878397
OR IN 250/551

ELECTRO-OPTICAL TRANSMISSION LINE

BACKGROUND OF THE INVENTION

This invention relates generally to an electro-optical transmission line and, more particularly, to the contact assemblies for such a line and the manner of connecting optical fiber bundles to such assemblies.

Electro-optical interconnection systems are known in which electrical signals are coupled to a first electrical connector member where the signal is converted by means of a light-emitting diode to an electrical output signal, and the latter signal is transmitted by an optical fiber bundle to a light-receiving diode in a second connector member which receives the optical signal and converts it back to an electrical signal. Such electro-optical transmission systems have the advantage over conventional electrical wiring systems that they are not susceptible to electro-magnetic interference (EMI) and radio frequency interference (RFI). Thus, such electro-optical transmission systems are not subject to noise interference which is important in numerous military and commercial applications. The presently known electro-optical systems, however, have the disadvantage of being difficult to maintain and repair in the field because the optical fiber bundles are permanently bonded to the electrical connectors which interconnect the bundles in the system. The object of the present invention is to overcome the aforementioned disadvantage of present electro-optical transmission line assemblies.

SUMMARY OF THE INVENTION

According to the principal aspect of the present invention, there is provided a novel contact termination arrangement for an electro-optical transmission line employing an optical fiber bundle. The contact termination for each end of the bundle comprises a coaxial electrical contact assembly. Each such assembly includes a shell and inner and outer contacts which are adapted to engage with mating contacts in a connector member in an electrical interconnection system. A radiation-emitting device is mounted in one of the shells in a direction toward one end of fiber bundle, and a photosensitive device is mounted in the shell at the opposite end of the bundle. These two devices are electrically connected to the inner and outer contacts of the respective contact assemblies, thereby providing a coaxial electrical interconnection system. Sleeves are provided at the opposite ends of the electro-optical fiber bundle which are threadably engaged to the shells of the corresponding electrical contact assemblies so that the bundle may be readily removed from the contact assemblies to facilitate field maintenance and repair.

Other aspects and advantages of the invention will become more apparent from the following description taken in connection with the accompanying drawings.

DESCRIPTION OF THE PREFERRED EMBODIMENT

Figure 1:
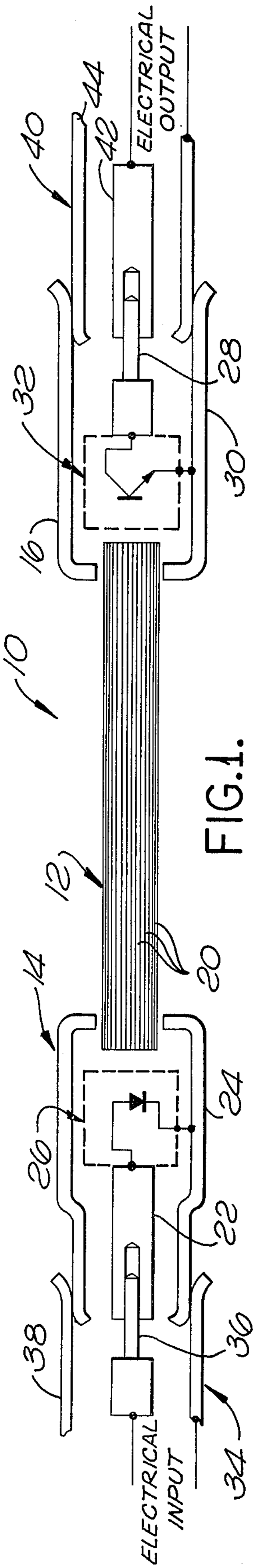
FIG. 1 is a schematic diagram of the electro-optical transmission line of the present invention shown connected to electrical input and output connector contacts.

Referring now to FIG. 1 of the drawing, there is shown an electro-optical transmission line, generally designated 10, comprising an optical fiber bundle 12 terminating in coaxial electrical contact assemblies 14 and 16. The optical fiber bundle is made up of a plurality of light transmitting fibers or strands 20 which are assembleld into a cylindrical bundle. Typically, such fibers are formed of Lucite plastic or quartz. The contact assembly 14 includes an inner contact 22 and an outer contact 24. A radiation emitting device 26, such as a light emitting diode, is mounted in the contact assembly 14 facing the optical fiber bundle 20. The device 26 is electrically connected to the inner contact 22 and outer contact 24. The coaxial contact assembly 16 at the opposite end of the bundle 12 also includes an inner contact 28 and an outer contact 30. A photosensitive device 32, such as an infrared photo diode, is mounted in the assembly 16 and is electrically connected to the inner and outer contacts 28 and 30, respectively.

A coaxial receptacle 34 including an inner contact 36 and outer contact 38 is coupled to the contact assembly 14. With the receptacle 34 and contact assembly 14 coupled, the inner contact 36 of the coaxial receptacle is engaged with the inner contact 22 of the contact assembly 14 while the outer contact 38 of the coaxial receptacle is engaged with the outer contact of the contact assembly. An electrical input signal is conveyed through the inner contacts 36 and 22 to the light emitting device 26, the latter being connected to a ground circuit, not shown, through the outer contacts 24 and 38. At the opposite end of the electro-optical transmission line 10, the contact assembly 16 is coupled to a coaxial plug 40 including an inner contact 42 and outer contact 44. The inner contact 42 is engaged with inner contact 28 of the contact assembly 16 while the outer contact 44 is engaged with the outer contact 30. In a manner well known in the art, when an electrical input signal is conveyed through coaxial receptacle 30 to the contact assembly 14, the light emitting device 26 becomes active. The radiant energy from the device is transmitted through the optical bundle 12 to the photosensitive device 32 which converts the transmitted radiant energy back to electric energy, thus producing an electrical output signal which is conveyed to a receiving circuit, not shown, through the coaxial plug 40.

Figure 2:
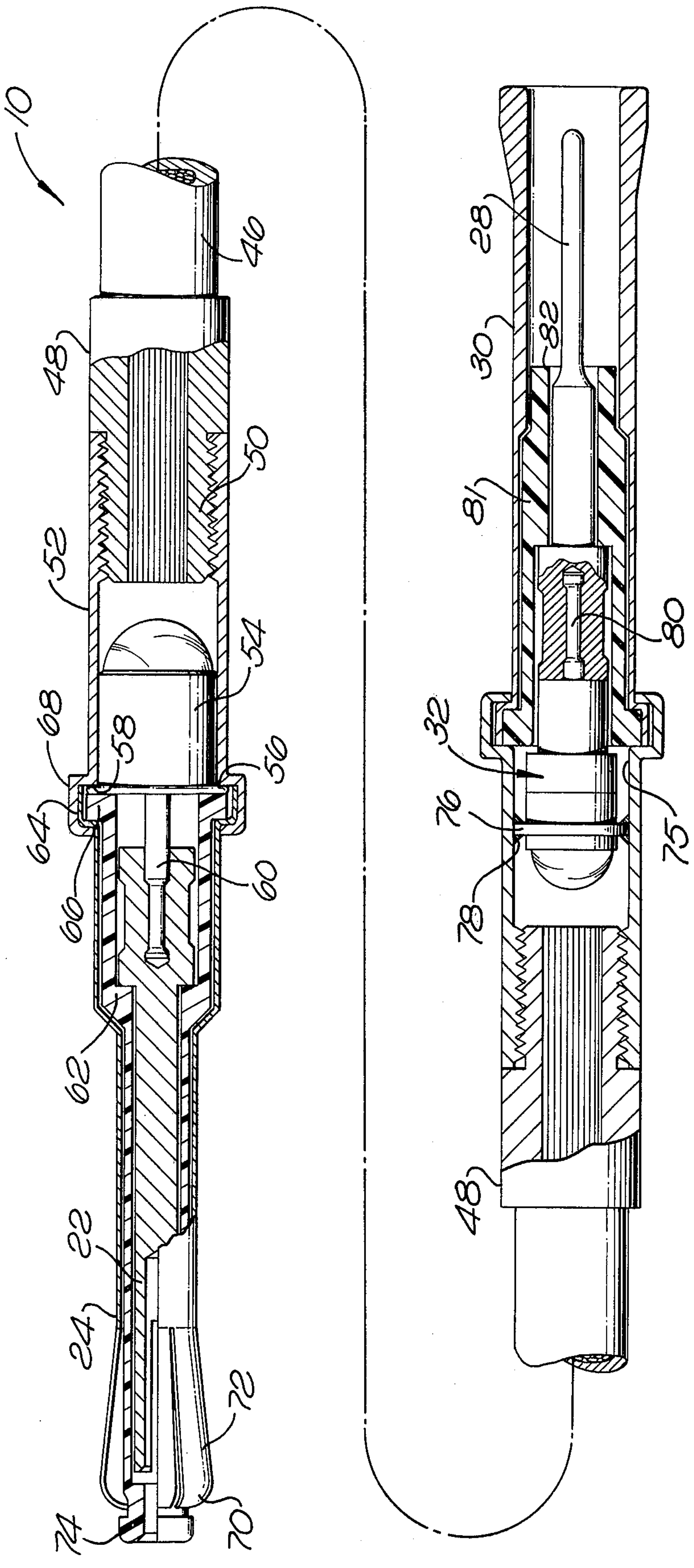
FIG. 2 is a partial longitudinal sectional view of the electro-optical transmission line of the present invention.

Reference is now made to FIG. 2 of the drawing which shows in detail the construction of the electro-optical transmission line 10 of the present invention. The fibers 20 of the bundle 12 are encased in a light shielding sleeve 46. At opposite ends of the bundle 12 there are provided metal sleeves 48 which are threaded at their ends 50. The optical fiber bundle 12 is secured at its ends to the sleeves 48 by a suitable adhesive or epoxy. The threaded ends 50 of the sleeves 48 are threadably engaged in cylindrical metal shells 52 which are identical in construction. The left hand shell 52 houses the light emitting device 26. Such device has a generally cylindrical metal outer casing 54 which is slidably and snuggly fitted in the shell 52. An outwardly extending flange 56 is formed at the rear of the casing. This flange abuts against a shoulder 58 formed on the shell 52. The engagement of the casing 54 and flange 56 with the shell 52 provides an electrical grounding connection between the light emitting device and the shell. A solder connection may be provided between the casing 54 and the shell 52 if desired.

A pin 60 extends rearwardly from the casing 54 of the light emitting device. The inner contact 22 of the coaxial contact assembly 14 is in the form of a socket contact which is crimped upon the pin 60. An annular insulator 62 surrounds the socket contact and the outer contact 24 surrounds the insulator. One end 64 of the outer contact is enlarged and surrounds an annular flange 66 formed on the insulator 62 adjacent the shell 52. The shell is rolled over the end 64 of the socket contact and the flange 66, as indicated at 68, to couple the contact assembly to the shell and retain the light emitting device 26 within the shell. The opposite end 70 of the outer contact 24 is flared and longitudinally slit to form spring fingers 72. The outer end of the insulator 62 extends through the flared end 70 of the outer contact and terminates in an enlarged head 74. Thus, the contact assembly 14 on the left hand end of the optical fiber bundle 12 forms a coaxial plug which may be mounted in any conventional coaxial receptacle contact assembly of a standard electrical connector member.

The coaxial contact assembly 16 at the opposite end of the fiber bundle 12 is connected into the shell 52 at such end in a manner almost identical to the contact assembly 14. The photosensitive device 32 has a cylindrical metal casing 75 of a diameter somewhat less than the shell. The casing is formed with a radially extending flange 76 which is soldered to the shell as indicated at 78 to provide an electrical connection therebetween. The device 32 also includes a pin 80 which is connected to the inner contact 28 by crimping. The inner contact 28 is in the form of a pin. The pin is separated from the outer contact 30 by an annular insulator 81. The inner and outer contacts 28 and 30 extend beyond the end 82 of the insulator 81 to form a coaxial receptacle which may be mated with a conventional coaxial plug mounted in a standard electrical connector member.

Thus, it will be appreciated from the foregoing that there are provided coaxial contacts for the light emitting and photosensitive devices 26 and 32, respectively, which allows these devices to be coupled to standard electrical connector members. Also, because the sleeves 48 mounted on the ends of optical fiber bundle 12 are threadably engaged into the shells 52 of the contact assemblies 14 and 16, maintenance and repair of the transmission line 10 is greatly facilitated.

Figure 3:
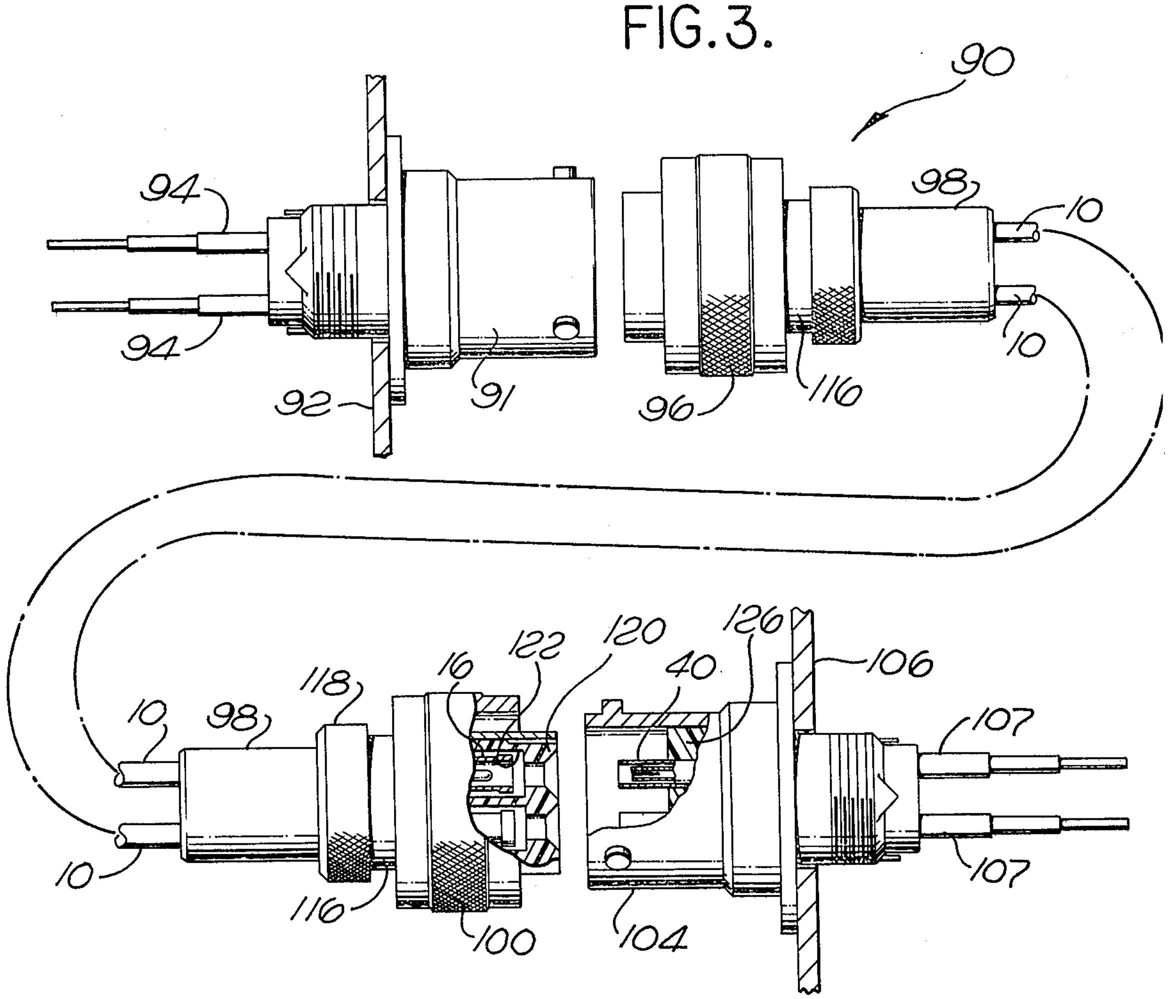
FIG. 3 is an exploded view, in elevation, of an electrical interconnection system employing a plurality of electro-optical transmission lines as illustrated in FIG. 2 with portions being shown in longitudinal section.
Figure 4:
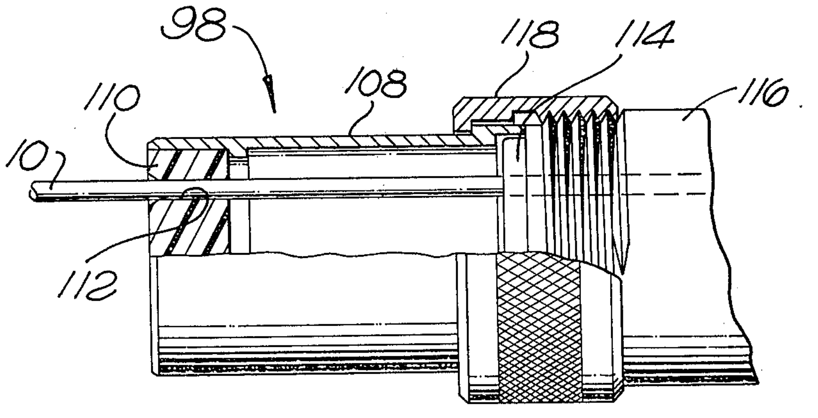
FIG. 4 is a partial longitudinal sectional view of the electro-optical transmission line coupling assembly employed in the interconnection system illustrated in FIG. 3.

Reference is now made to FIG. 3 of the drawings which shows an electrical interconnection system employing a plurality of electro-optical transmission lines 10. While only two of such lines are shown in the drawing, it will be appreciated that the system may employ as many lines as is permitted by the number of electrical contacts that can be mounted in the connector members to which the lines are coupled.

The system 90 includes an electrical connector member 91 which is mounted on a panel 92. A plurality of coaxial cables 94 extend into the connector 91 and terminate in coaxial receptacle contacts 34 therein, not shown. A second connector member 96 is coupled to the one end of the transmission lines 10 through a coupling assembly 98. The other end of the lines 10 are coupled to an electrical connector member 100 through a second coupling assembly 98. The connector member 100 is adapted to be connected to a mating connector member 104 mounted on a panel 106. Coaxial cables 107 extend from the connector member 104 to a receiving circuit, not shown.

The coupling assembly 98 comprises a metal sleeve 108 having a rubber grommet 110 in one end thereof which is formed with a plurality of longitudinally extending passages 112 each of which receives one of the electro-optical transmission lines 10. A second rubber grommet 114 is provided at the other end of the metal sleeve 108 adjacent a threaded boss 116 which extends rearwardly from the connector member 96 or 100. A coupling nut 118 secures the sleeve 108 to the boss 116.

The connector member 100 is shown as being a standard connector plug provided with an insulator 120 having a plurality of passages 122 therein each receiving one of the coaxial receptacle contact assemblies 16 at the end of a transmission line 10. The coaxial receptacle contact assemblies 16 are adapted to engage coaxial plug contact assemblies 40 mounted in an insulator 126 in the connector member 104. The contact assemblies 40 are connected to the coaxial cables 107. Thus, as illustrated, the connector member 100 is shown as being a plug while the connector member 104 is shown as being a receptacle. The connector members 91 and 96 may have a construction similar to the connector members 104 and 100, respectively. Alternatively, either connector member 96 or 100 could be a receptacle connector member while the corresponding connector members 91 and 104 could be plug connector members. In any event, the connector member 96 contains the coaxial receptacle contact assemblies 14 on the end of the electro-optical transmission lines 10. Thus, it can be seen that when the connector members 91 and 96 are coupled together, electrical signals entering the connector member 91 through the coaxial cables 94 will pass through the coaxial receptacles 34 in the connector member and the coaxial plug contact assemblies 14 in the connector member 96 to energize the radiation emitting devices 26. Radiant energy from these devices is then transmitted through the optical fiber bundles 12 in each of the transmission lines 10 to the photosensitive devices 32 in the connector member 100 where such radiant energy is converted back to electrical signals. The electrical signals from the devices 32 are then transmitted via the coaxial receptacle contact assemblies 16 in the connector member 100 and the coaxial plugs 40 in the connector member 104 to the coaxial conductors 107.

What is claimed is:

1. In an electro-optical transmission line:

at least one optical fiber;

a coaxial electrical contact assembly at an end of said fiber;

said contact assembly including a shell and a pair of inner and outer contacts extending outwardly from one end of said shell, said outer contact surrounding said inner contact;

an optoelectronic device in said shell directed toward said end of said fiber, said device being electrically connected to said inner and outer contacts; and coupling means on said end of said fiber readily removably connecting said fiber end to the other end of said shell.

2. A transmission line as set forth in claim 1 wherein:

said coupling means comprises a sleeve on said end of said fiber, said sleeve being threadedly engaged with said other end of said shell.

3. A transmission line as set forth in claim 1 including a plurality of said fibers arranged in a bundle.

* * * * *